(12) United States Patent
Moore et al.

(10) Patent No.: US 7,051,251 B2
(45) Date of Patent: May 23, 2006

(54) METHOD FOR STORING DATA IN A WRITE-ONCE MEMORY ARRAY USING A WRITE-MANY FILE SYSTEM

(75) Inventors: Christopher S. Moore, San Jose, CA (US); Richard M. Fruin, San Jose, CA (US); Chia Yang, San Jose, CA (US); Kyle Loudon, San Jose, CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 521 days.

(21) Appl. No.: 10/327,680

(22) Filed: Dec. 20, 2002

(65) Prior Publication Data

US 2004/0123064 A1    Jun. 24, 2004

(51) Int. Cl.
*G06F 12/02* (2006.01)

(52) U.S. Cl. .................... 714/710; 711/156; 711/170

(58) Field of Classification Search ................ 714/710
See application file for complete search history.

(56) References Cited

U.S. PATENT DOCUMENTS

| | | | |
|---|---|---|---|
| 4,646,266 A | 2/1987 | Ovshinsky et al. ......... 365/105 |
| 4,682,318 A | 7/1987 | Busby ..................... 369/59.25 |
| 4,691,299 A | 9/1987 | Rivest et al. .......... 365/189.01 |
| 4,740,890 A | 4/1988 | William ..................... 713/200 |
| 5,029,125 A | 7/1991 | Sciupac ..................... 707/205 |
| 5,040,110 A | 8/1991 | Miki et al. ................. 707/200 |
| 5,119,291 A | 6/1992 | Flannagan et al. ............ 711/14 |
| 5,247,494 A | 9/1993 | Ohno et al. .............. 364/13.02 |
| 5,261,072 A | 11/1993 | Siegel ......................... 710/22 |
| 5,307,497 A | 4/1994 | Feigenbaum et al. .......... 713/1 |
| 5,321,824 A | 6/1994 | Burke et al. ................. 711/220 |
| 5,437,012 A | 7/1995 | Mahajan ..................... 711/111 |
| 5,437,028 A | 7/1995 | Iijima ......................... 707/205 |
| 5,448,728 A | 9/1995 | Takano et al. ............. 707/205 |
| 5,457,796 A | 10/1995 | Thompson ................. 707/203 |
| 5,463,772 A | 10/1995 | Thompson et al. ......... 707/101 |
| 5,475,820 A | 12/1995 | Natrasevschi et al. ...... 711/100 |
| 5,537,652 A | 7/1996 | Friedl et al. ................. 711/111 |
| 5,559,778 A | 9/1996 | Inokuchi et al. ............ 369/532 |
| 5,590,320 A | 12/1996 | Maxey ....................... 707/203 |
| 5,630,093 A | 5/1997 | Holzhammer et al. ...... 711/115 |

(Continued)

FOREIGN PATENT DOCUMENTS

EP      1168150 A1 *  1/2002

(Continued)

OTHER PUBLICATIONS

Danny Dolev et al.; Correcting faults in write-once memory; Annual ACM Symposium on Theory of Computing archiveProceedings of the sixteenth annual ACM symposium on Theory of computing; pp. 225-229; 1984; □□ISBN:0-89791-133-4.*

(Continued)

*Primary Examiner*—R. Stephen Dildine
(74) *Attorney, Agent, or Firm*—Brinks Hofer Gilson & Lione

(57) ABSTRACT

The preferred embodiments described herein provide various data allocation and error recovery methods that allow data to be written to a write-once memory array using a write-many file system. Other preferred embodiments described herein relate to methods for generating a set of valid file system structures. The various preferred embodiments can be used alone or in combination with one another.

37 Claims, 14 Drawing Sheets

U.S. PATENT DOCUMENTS

| | | | |
|---|---|---|---|
| 5,752,005 A | 5/1998 | Jones | 703/22 |
| 5,761,700 A | 6/1998 | Cozart et al. | 711/103 |
| 5,761,741 A | 6/1998 | Robbins et al. | 711/212 |
| 5,832,263 A | 11/1998 | Hansen et al. | 719/322 |
| 5,835,396 A | 11/1998 | Zhang | 365/51 |
| 5,890,169 A | 3/1999 | Wong et al. | 707/206 |
| 6,000,023 A | 12/1999 | Jeon | 711/173 |
| 6,034,882 A | 3/2000 | Johnson et al. | 365/103 |
| 6,055,180 A | 4/2000 | Gudesen et al. | 365/175 |
| 6,073,208 A | 6/2000 | Norman | 711/103 |
| 6,104,635 A | 8/2000 | Ogane | 365/185.08 |
| 6,138,203 A | 10/2000 | Inokuchi et al. | 711/103 |
| 6,185,122 B1 | 2/2001 | Johnson et al. | 365/103 |
| 6,236,587 B1 | 5/2001 | Gudesen et al. | 365/105 |
| 6,341,085 B1 | 1/2002 | Yamagami et al. | 365/185.09 |
| 6,345,333 B1 | 2/2002 | Sassa et al. | 711/103 |
| 6,351,838 B1 | 2/2002 | Amelia | 714/770 |
| 6,370,642 B1 | 4/2002 | Chiang et al. | 713/1 |
| 6,377,526 B1 | 4/2002 | Vining et al. | 369/33.1 |
| 6,424,581 B1 | 7/2002 | Bosch et al. | 365/195 |
| 6,490,703 B1 | 12/2002 | de la Iglesia et al. | 714/746 |
| 6,515,888 B1 | 2/2003 | Johnson et al. | 365/130 |
| 6,545,891 B1 | 4/2003 | Tringali et al. | 365/51 |
| 6,584,541 B1 | 6/2003 | Friedman et al. | 711/103 |
| 6,598,135 B1 | 7/2003 | MacLeod | 711/163 |
| 6,631,107 B1 | 10/2003 | Ito et al. | 369/53.2 |
| 6,647,471 B1 | 11/2003 | March et al. | 711/154 |
| 6,658,438 B1 | 12/2003 | Moore et al. | 707/205 |
| 6,667,939 B1 | 12/2003 | Miyamoto | 369/53.21 |
| 6,675,276 B1 * | 1/2004 | Schulze et al. | 711/200 |
| 6,772,274 B1 | 8/2004 | Estakhri | 711/103 |
| 6,836,834 B1 * | 12/2004 | Schulze et al. | 711/200 |
| 2002/0034105 A1 | 3/2002 | Kulkami et al. | 365/200 |
| 2002/0065983 A1 | 5/2002 | Friedman et al. | 711/112 |
| 2002/0107862 A1 | 8/2002 | Moore et al. | 707/101 |
| 2002/0108054 A1 | 8/2002 | Moore et al. | 713/200 |
| 2003/0120858 A1 | 6/2003 | March et al. | 711/103 |

FOREIGN PATENT DOCUMENTS

| | | |
|---|---|---|
| EP | 1 331 548 A2 | 7/2003 |
| EP | 1 359 500 A2 | 11/2003 |
| JP | 07-045085 | 2/1995 |
| JP | 410283717 A | 10/1998 |
| WO | WO 99/14763 | 8/1998 |

OTHER PUBLICATIONS

Ronald L. Rivest, Adi Shamir; How to reuse a "write—once" memory (Preliminary Version); May 1982; Proceedings of the fourteenth annual ACM symposium on Theory of computing; pp. 105-113; ISBN:0-89791-070-2.*

Zemor, G. and Cohen, G.D.; Error-correcting WOM-codes; information Theory, IEEE Transactions on; May 1991; vol 37, issue: 3, Part 2; pp.: 730-734; ISSN: 0018-9448.*

"Method for Making a Write-Once Memory Device Read Conpatible with a Write-Many File System," U.S. Appl. No. 10/023,468, filed Dec. 14, 2001, Inventors: Moore et al.

Press Release. "DataPlay, Inc.- What's Playing on DataPlay. . . Everything Digital!," 2 Pages, Jan. 7, 2002.

"New Direct CD 2.5 Improves Speed and Reliability of Data Archiving Using CD-R/CD-RW," http://www.adaptec.com/worl. . . pany/pressrelease.html?prodkey=08051998, 2 pages, Aug. 5, 1998.

"Universal Disk Format (UDF) Driver," http://www.trylinux.com/projects/udf/index.html. 3 pages (1999).

"FAT file Allocation Table," http://www.eaydesksoftware.com/fat.html, 2 pages, Oct. 24, 1999.

"FAT File Allocation Table," http://www.oreilly.com/reference/directory/terms/F/File_Allocation$_{13}$Table.htm, 4 pages (1996).

"ISO9960 Simplied for DOS/Windows by Philip J. Erdelsky," http://ww.alumni.caltech.edu/~pje/iso.9660.html, 8 pages Aug. 26, 2000.

"Memory cards: designing with a full deck," http://www.ednmag.com/ednmag/reg/2000/05250000/11dfl.htm, 12 pages, May 25, 2000.

"DOS Disk Formats," http://www.qvctc.commnet.edu/classes/csc277/formats.html, 7 pages (1999).

"MS-DOS Partitioning Summary," http://www.qvctc.commnet.edu/classes/csc277/fdisk2.html, 3 pages (1999).

"DOS Partitions," http://www.qvctc.commnet.edu/classes/csc277/partitions.html, 5 pages (1999).

"DOS Disk Structure-Definitions," http://www.qvctc.commnet.edu/classes/csc277/formats2.html, 3 pages (1999).

"MS-DOS Summary A Survival Guide," http://www.washtenaw.cc.mi.us/dept/cis/mod/q02cd.html, 10 pages (1996).

"Hardware White Paper, FAT: General Overview of On-Disk Format," Microsoft Corp., 25 pages, May 5, 1999.

"Method for Deleting Stored Digital Data from Write-Once Memory Device," U.S. Appl. No. 09/638,439, filed Aug. 14, 2000; Inventors: Christopher S. Moore, Derek J. Bosch, Daniel C. Steere, and J. James Tringali.

"Three-Dimesional Memory Array and Method of Fabrication," U.S. Appl. No. 09/560,626, filed Apr. 28, 2000; Inventor: Johan Knall.

"MS-DOS Filesystem," http://www.cs.adfa.oz.au/teaching/studinfo/osrts/Lectures/node113.html, 2 pages Mar. 1, 2001.

"comp.os.ms-windows.programmer.vxdFrequency asked Questions (FAQ)," http://www.faqs.org/faqs/windows/programming/vxd/, 16 pages (1995).

"CD-ROM Driver Installation Procedure," http://www.pcguide.com/proc/setup/cddriver-c.html, 3 pages, Apr. 17, 2001.

"Fujifilm News & Events, Medical Imaging Science Systems NDT Systems," http://www.fujimed.com/news/news_openarch.html, 2 pages, Nov. 26, 2000.

"CNN.com DVD Encryption hacked," http://www.cnn.com/TECH/computing/9911/05/dvd.hack.idg/, 3 pages, Nov. 5, 1999.

"Octopus Systems, Acorn's Solution for the Java™ Technology Platform," http://www.octosys.co.uk/java.html, 9 pages (2001).

"Content Protection System Architecture, A Comprehensive Framework for Content Protection Intel Corp.," 19 pages, Feb. 17, 2000.

"Media security thwarts templation, permits prosecution," http://www.ednmag.com/ednmag/reg/2000/06222000/13tt.htm, 13 pages, Jun. 22, 2000.

"Memory Devices and Methods for Use Therewith," U.S. Appl. No. 09/748,589, filed Dec. 22, 2000; Inventors: Roger W. March, Christopher S. Moore, Daniel Brown, Thomas H. Lee, and Mark H. Johnson.

"Memory Device and Method for Storing and Reading Data in a Write-Once Memory Array," U.S. Appl. No. 09/877,720, filed Jun. 8, 2001; Inventors: Christopher S. Moore, James E. Schneider, J. James Tringali, and Roger W. March.

"Memory Device and Method for Storing and Reading a File System Structure in a Write-Once Memory Array," U.S. Appl. No. 09/877,719, filed Jun. 8, 2001; Inventors: Christopher S. Moore, James E. Schneider, J. James Tringali, and Roger W. March.

"Method for Reading Data in a Write-Once Memory Device Using a Write-Many File System," U.S. Appl. No. 09/878,138, filed Jun. 8, 2001; Christopher S. Moore, J. James Tringali, Roger W. March, James E. Schneider, Derek J. Bosch, and Daniel C. Steere.

"Method for Redirecting Data Traffic in a Write-Once Memory Device," U.S. Appl. No. 09/877,691, filed Jun. 8, 2001; J. James Tringali, Christopher S. Moore, Roger W. March, James E. Schneider, Derek J. Bosch, and Daniel C. Steere, "Chapter 32—Disk Concepts and Troubleshooting," Microsoft Windows 2000 Professional Resource Kit, Microsoft Corporation, 29 pages, Mar. 15, 2000.

"Exotic Memories, Diverse Approaches," EDN Asia, pp. 22-33 (Sep. 2001).

"A Vertical Leap for Microchips," Thomas H. Lee, Scientific American, 8 pages (Jan. 2002; printed Dec. 10, 2001).

"SmartMedia Physical Format Specifications Version 1.30," SSFDC Forum technical Committee, 23 pages (May 19, 2000).

"SmartMedia Electrical Specifications Version 1.30," SSFDC Forum Technical Committee, 23 pages (May 19, 2000).

NN8803151, IBM Technical Disclosure Bulletin, "Incremental Directory Indexes for Write-Once Media", Mar., 1988, vol. 30, Issue 10, pp. 151-155.

"How Does TrueFFS Manage Wear Leveling," http://www.m-sys.com/content/information/calcInfo.asp, 2 pages, Oct. 2001.

"Datalight FlashFX 4.06," User's Guide, p. 11, Aug. 2000.

"How Flash Memory Works," http://howstuffworks.com/flash-memory.htm?printable=1, 5 pages, Sep. 2001.

"Flash Memory," Samsung Electronics, 39 pages, Jul. 2004.

* cited by examiner

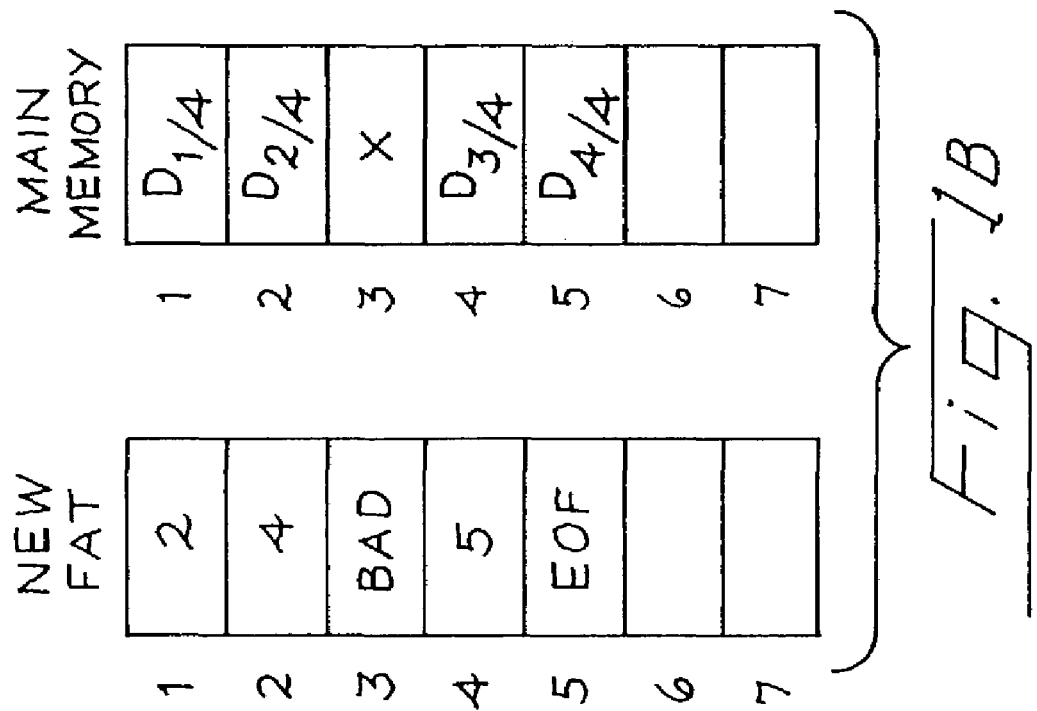

| | NEW FAT | | | MAIN MEMORY |
|---|---|---|---|---|
| 1 | 2 | | 1 | $D_{1/4}$ |
| 2 | 3 | | 2 | $D_{2/4}$ |
| 3 | 4 | | 3 | $D_{3/4}$ |
| 4 | 5 | | 4 | $D_{4/4}$ |
| 5 | 6 | | 5 | $D'_{1/4}$ |
| 6 | 8 | | 6 | $D'_{2/4}$ |
| 7 | X | | 7 | X |
| 8 | 9 | | 8 | $D'_{3/4}$ |
| 9 | 11 | | 9 | $D'_{4/4}$ |
| 10 | X | | 10 | X |
| 11 | 12 | | 11 | $D''_{1/4}$ |
| 12 | 13 | | 12 | $D''_{2/4}$ |
| 13 | 14 | | 13 | $D''_{3/4}$ |
| 14 | EOF | | 14 | $D''_{4/4}$ |

Fig. 2D

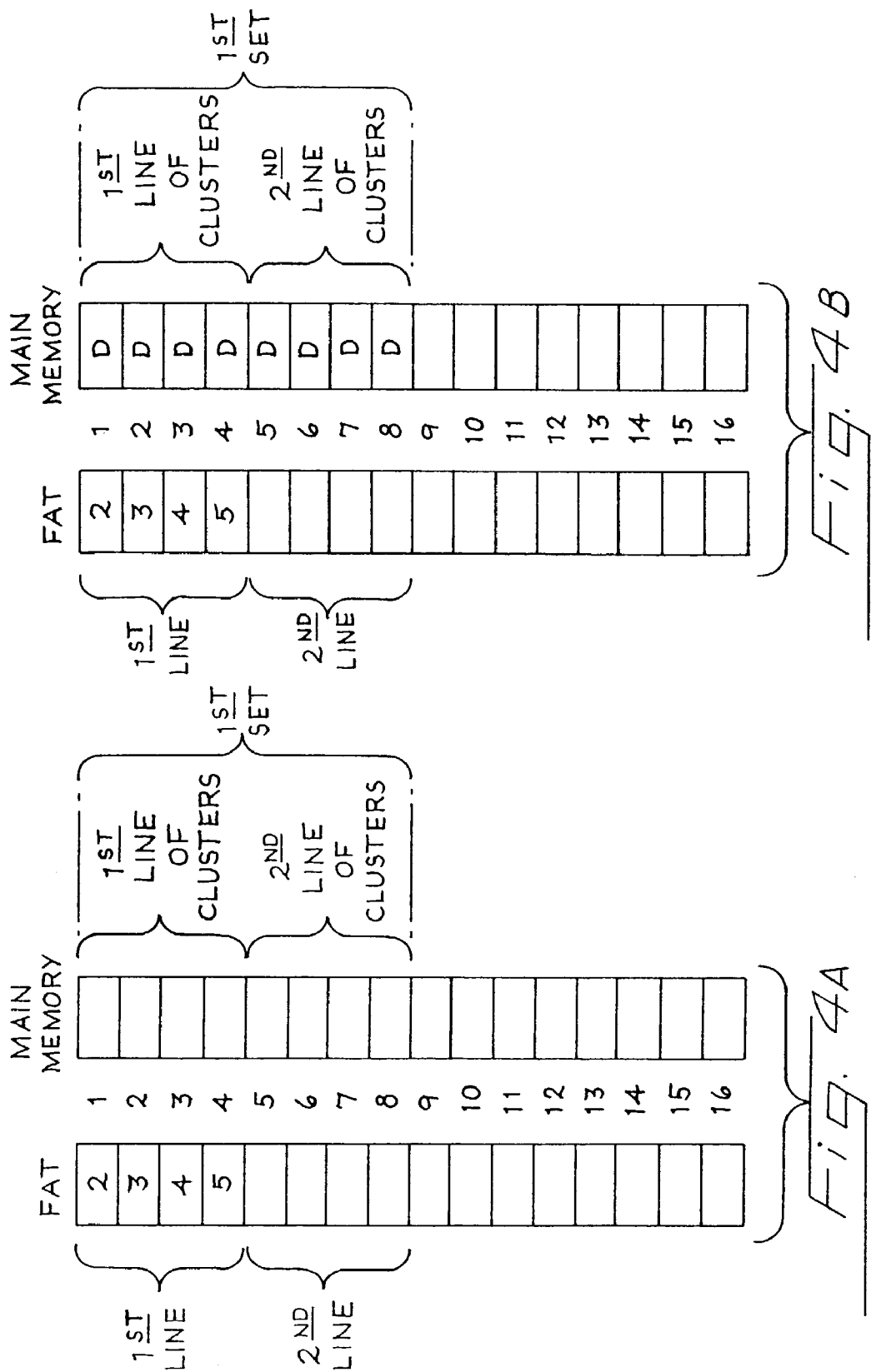

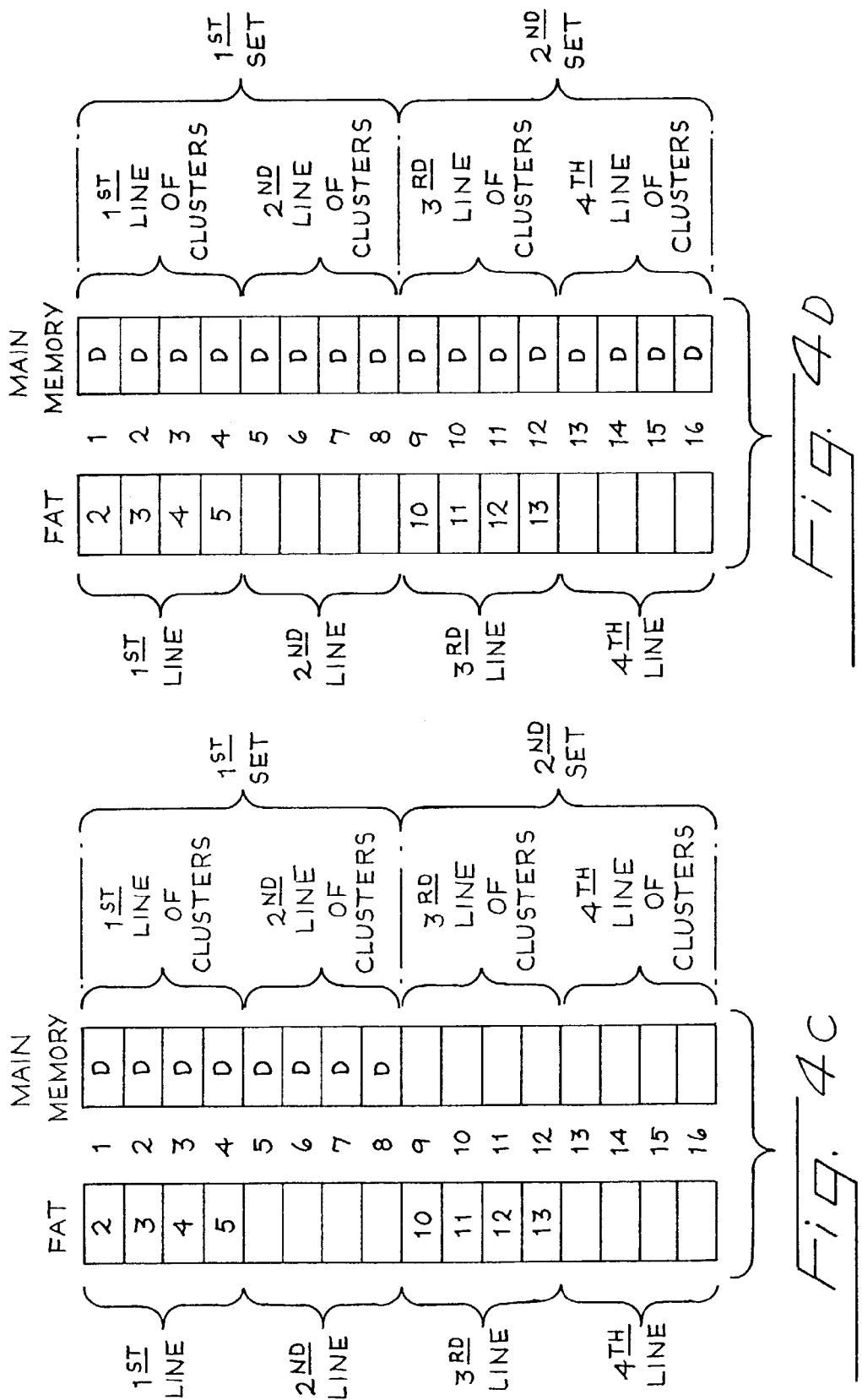

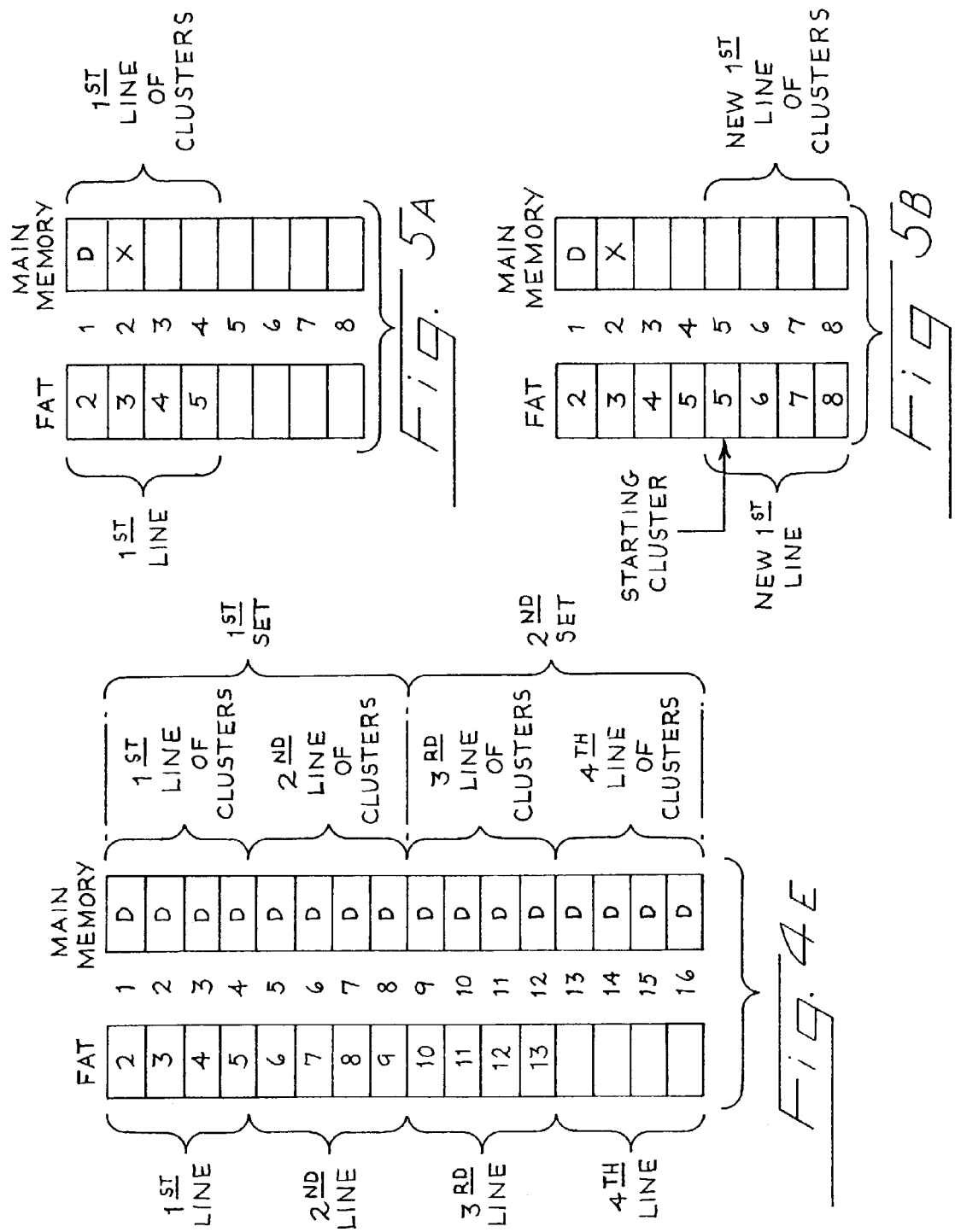

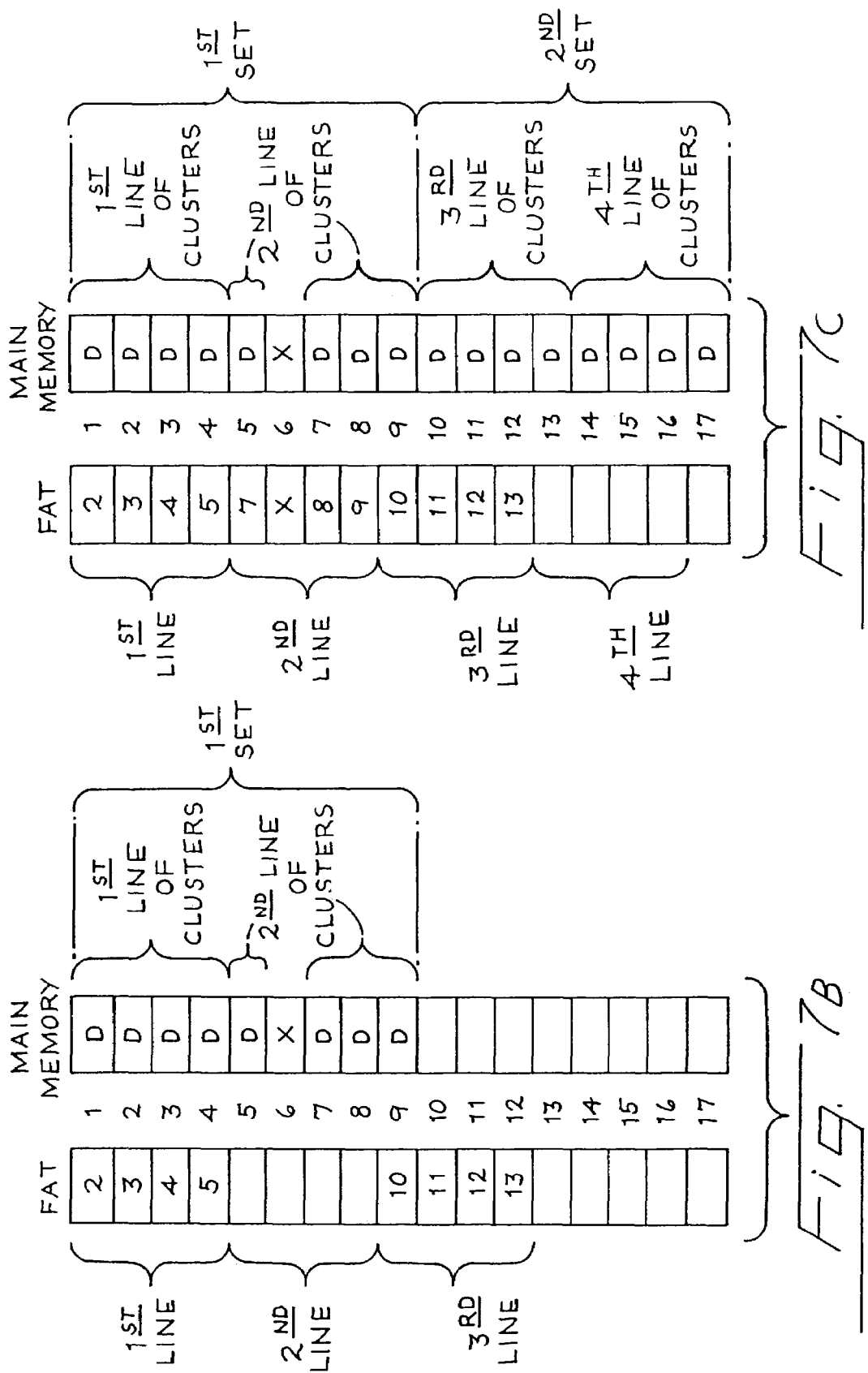

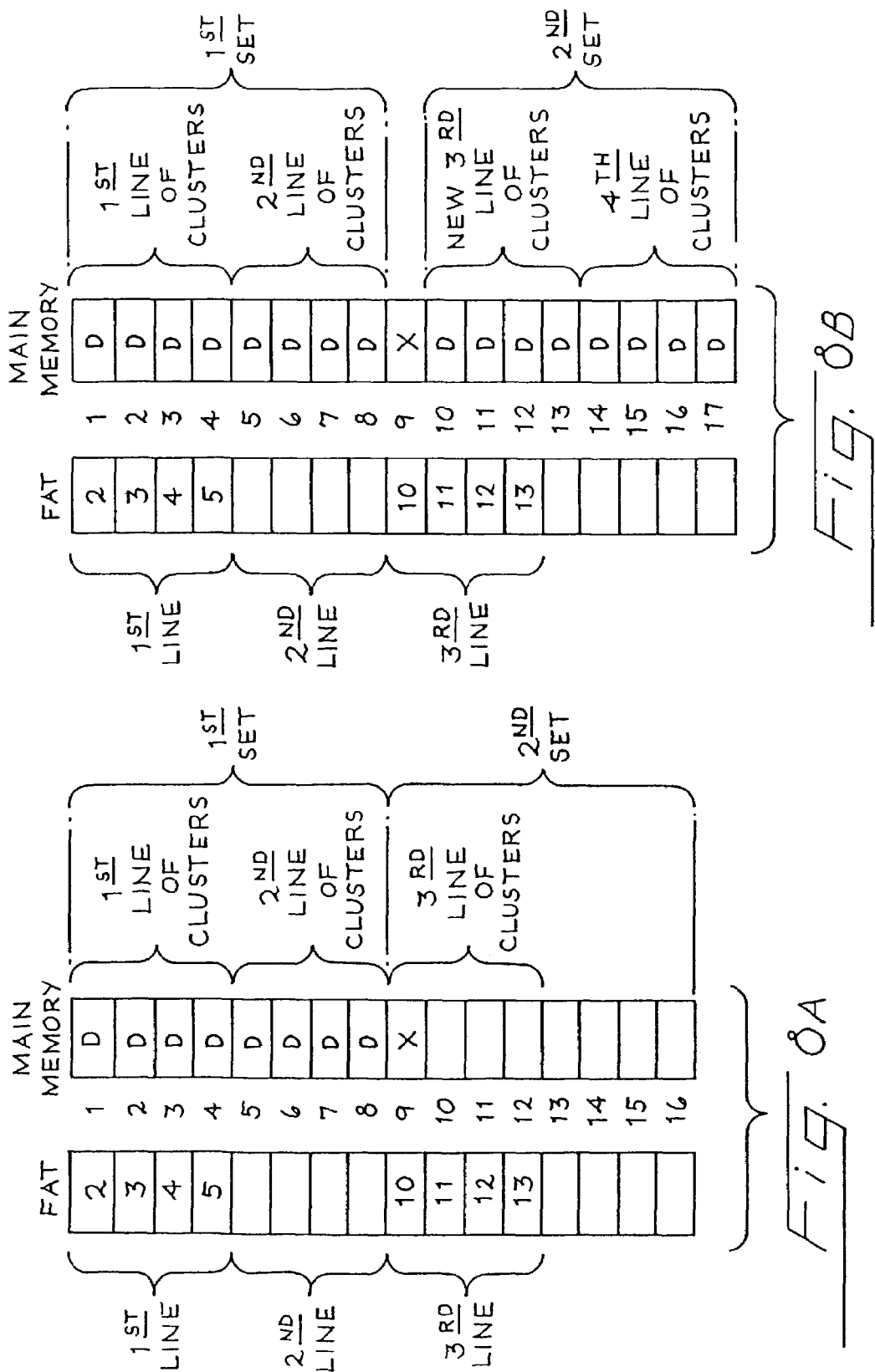

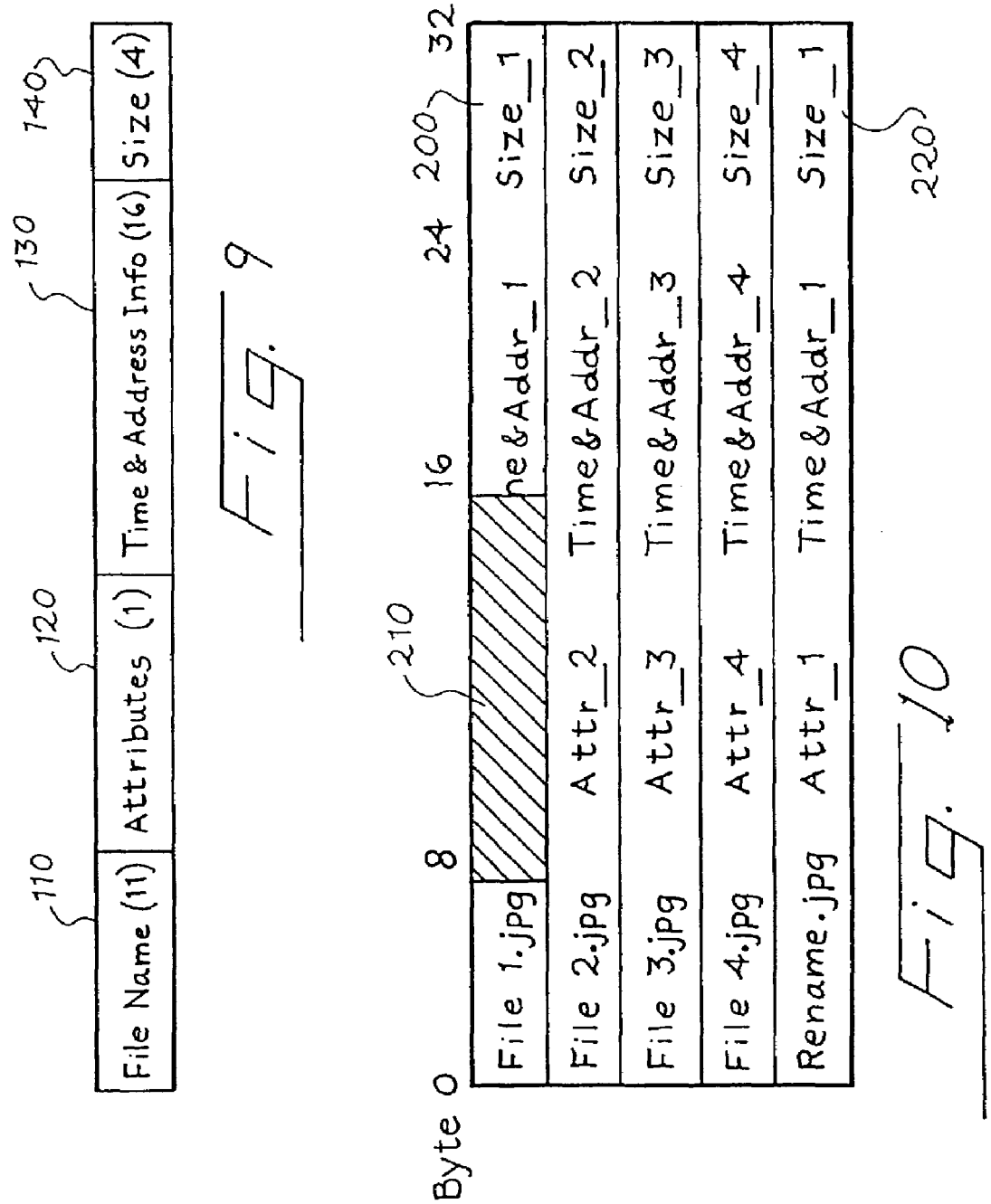

METHOD FOR STORING DATA IN A WRITE-ONCE MEMORY ARRAY USING A WRITE-MANY FILE SYSTEM

BACKGROUND

Non-volatile memory is becoming standard in consumer appliances such as digital cameras, digital audio players, and personal digital assistants. The prevalence of the MS-DOS FAT file system in the personal computer space has led to a broad acceptance of this file system in the nascent consumer appliance market as well. The DOS FAT file system re-writes file system structures, such as entries in a file allocation table, when data is modified. Because the memory cells in a write-once memory device can only be written into once, the DOS FAT file system is typically not used with write-once memory devices. Instead, specially-designed write-once file systems, such as ISO9660 and Universal Disk Format (UDF), are used. Unfortunately, data stored using a write-once file system typically cannot be read by a write-many file system. This leads to an interoperability problem between write-once memory devices and host devices using a write-many file system (e.g., personal computers using the DOS FAT file system). Further, while the ISO9660 and UDF write-once file systems are appropriate for optical media, such as CD-ROMs and DVDs, they are not suitable for a semiconductor memory operating in consumer electronic devices.

There is a need, therefore, for a method for storing data in a write-once memory array using a write-many file system.

SUMMARY

The present invention is defined by the following claims, and nothing in this section should be taken as a limitation on those claims. By way of introduction, the preferred embodiments described below provide various data allocation and error recovery methods that allow data to be written to a write-once memory array using a write-many file system. Other preferred embodiments described herein relate to methods for generating a set of valid file system structures. The various preferred embodiments can be used alone or in combination with one another. The preferred embodiments will now be described with reference to the attached drawings.

BRIEF DESCRIPTION OF THE DRAWINGS

FIGS. 1A and 1B illustrate a data allocation scheme of a preferred embodiment.

FIGS. 2A–2D illustrate a data allocation scheme of another preferred embodiment.

FIGS. 4A–4E illustrate the operation of the method shown in the flow chart of FIG. 3.

FIGS. 5A and 5B illustrate an error handling operation of the method shown in the flow chart of FIG. 3 when an error occurs in the very first line of clusters.

FIGS. 7A–7C illustrate an error handling operation of the method shown in the flow chart of FIG. 3 when an error occurs in the second cluster of the second line of clusters.

FIGS. 8A–8C illustrate an error handling operation of the method shown in the flow chart of FIG. 3 when an error occurs in the first line of a second set of clusters.

FIG. 9 is an illustration of a 32-byte field storing file information of a preferred embodiment.

FIG. 10 illustrates a file rename operation of a preferred embodiment.

DETAILED DESCRIPTION OF THE PRESENTLY PREFERRED EMBODIMENTS

Figure 2A:
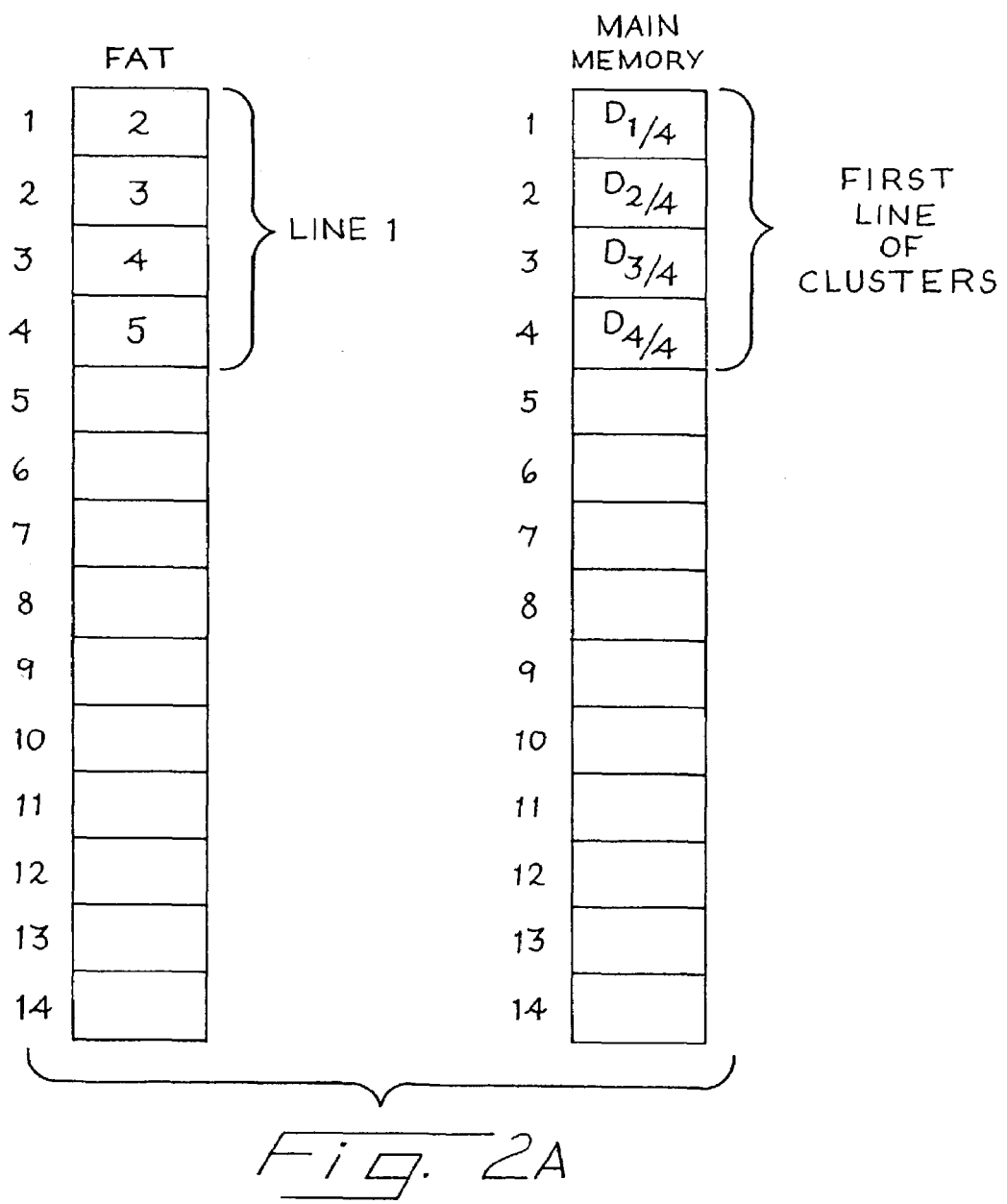

The preferred embodiments described herein relate to memory arrays comprising a plurality of field-programmable, non-volatile write-once memory cells. A field-programmable memory cell is a memory cell that is fabricated in an initial, un-programmed digital state and can be switched to an alternative, programmed digital state at a time after fabrication of the memory cell. In these preferred embodiments, the original, un-programmed digital state is identified as the Logic 1 state, and the programmed digital state is identified as the Logic 0 state. In a write-once memory cell, an original, un-programmed digital state cannot be restored once switched to a programmed digital state. The memory cells of the write-once memory array are preferably made from a semiconductor material, although other materials, such as phase-change materials and amorphous solids as well as those used with MRAM and organic passive element arrays, can be used. Although the write-once memory cells can be arranged in a conventional two-dimensional array, it is preferred that the memory cells be arranged in a plurality of layers stacked vertically above one another in a single integrated circuit, as described in U.S. Pat. Nos. 6,034,882 and 6,420,215 and U.S. Patent Application Ser. No. 2002/0,028,541, which are assigned to the assignee of the present application and are hereby incorporated by reference.

A write-once memory array can be part of a compact, handheld modular memory device (such as a memory card or stick) that is removably connectable to a host device having a mating connection. Preferably, the memory device is a solid-state memory that responds to electrical read and write signals to cause digital information to be read from and stored in the write-once memory array. The host device can be a data reading and/or storage device that comprises a processing unit that reads data from and/or writes data to the write-once memory array. The host device can be, for example, a portable consumer electronic device such as a cell phone, a music player, a personal digital assistant, or a digital camera.

As described in the background section above, because the memory cells in a write-once memory device can only be written into once, write-many file systems, such as the DOS FAT file system, are typically not used with write-once memory devices. (Although the DOS FAT file system will be used to illustrate these preferred embodiments, it should be noted that other write-many file systems can be used.) Accordingly, one would assume that a host device must use a write-once file system to write data to and read data from a write-once memory array. However, the assignee of the present application has developed several techniques to ensure that a write-once memory array can be read by host devices using the DOS FAT file system. See, for example, U.S. patent application Ser. Nos. 09/748,589; 09/877,691; 09/877,719; 09/877,720; 09/878,138; and 10/023,468; each of which is hereby incorporated by reference.

One technique used to ensure DOS FAT read compatibility is an operation referred to herein as "FAT Close." In a FAT Close operation, DOS FAT file system structures are stored in the memory device after data is written in the write-once memory array. With these DOS FAT file system structures, a DOS FAT host device can read the data stored in the write-once memory array. Because DOS FAT file system structures cannot be modified once written in the write-once memory array, new file system structures (e.g., a new MBR, PBR, FATs, and root directory) are written in a different part of the memory array whenever DOS FAT file system structures need to be modified (e.g., when a change needs to be made to a FAT entry). Because a DOS FAT file system always looks for file system structures at the same locations in the memory array, the DOS FAT file system will read the out-of-date file system structures instead of the newly-written file system structures. However, with the techniques disclosed in the patent applications referenced above, when the host device attempts to read file system structures, the host device reads the new file system structures instead of the outdated file system structures. In one technique, a pointer pointing to the most up-to-date file system structures is stored in the memory array. When a memory device comprising the write-once memory array is powered-up or when system reset occurs, a controller in the memory device finds the current pointer and stores the pointer in a register in the memory device. This stored address will be used when the host device sends a request to read an address storing the outdated file system structures. In this way, requests to read memory addresses storing outdated file system structures will be redirected to the memory addresses indicated by the pointer. It should be noted that any other technique described in the above-reference patent applications can be used to ensure the most up-to-date file system structures are read from the write-once memory array. In summary, a FAT Close operation writes a new set of file system structures in "fresh" write-once memory cells to replace an old set of file system structures and ensures that the new set of file system structures will be read instead of the old set. In this way, the FAT Close operation allows a DOS FAT read compatible write-once memory array to be updateable.

If data is merely added to the write-once memory array, a FAT Close operation does not need to be performed. Instead, previously-written file system structures can be appended with information concerning the newly-stored data. For example, a string of 0s usually represents unallocated entries in a file allocation table and also represents the end of a directory (e.g., root directory or sub-directory). If a new file is added to the memory array after file system structures have been written, the location of the new file can be written into the 0s in the file allocation table, and the name and attributes of the new file can be written into the 0s at the end of the directory. In this way, information about the new file is appended to pre-existing file system structures, and memory space is conserved. This operation is described in U.S. patent application Ser. No. 09/877,719 and is referred to herein as the "FAT Append" operation. As described in that patent application, because Logic 1 is the initial, unprogrammed digital state of a memory cell in these preferred embodiments, it is preferred that at least the bits representing file system structures be inverted. (As described below, it is further preferred that all bits—not just the bits representing file system structures—be inverted.) In this way, Logic 1 bits of file system structures are stored as Logic 0 bits, and Logic 0 bits of file system structures are stored as Logic 1 bits. Inverting file system structure bits essentially redefines the value of the unwritten bit in the file system structure section of the memory array as Logic 0 and avoids the need to write new file system structures during each close operation. Instead, a previously-written file system structure can be updated or appended to reflect the addition of data.

It should be noted that in at least some embodiments described in the above-referenced patent applications, write-once file system structures were written to the memory array before updating FAT structures through a FAT Close or FAT Append operation. To ensure maximum compatibility, a FAT Close or FAT Append operation would be performed after every data update. For example, a consumer electronic device, such as a digital camera, would update the write-once file system structures with new file data and attribute information when taking a new picture and then would perform a FAT Append operation to update the DOS FAT structures to ensure the memory device would be readable in devices that use the DOS FAT file system, such as photo-smart printers, kiosks, and PDA's. With the present embodiments, it is preferred that the intermediate step of writing write-once file system structures be eliminated. In this way, the only file system structure stored in the memory device in addition to the standard DOS FAT structures (e.g., FAT Table, Partition Boot Record, Master Boot Record, Root Directory, Subdirectories) is the redirection pointer table used for the FAT Close and FAT Clean operations (the FAT Clean operation will be described in detail below). The following paragraphs described various data allocation methods that can be used in situations in which write-once file system structure are not written.

In the following illustrations, the write-once memory array comprises a file allocation table and a main memory. A "line" refers to the minimum amount of data that can be written to the write-once memory array (either to the file allocation table or the main memory), and a "cluster" is a set of contiguous memory cells in the main memory that can be written into with data. A cluster can be of any desired size. The size of a cluster can be determined by the file format (e.g., FAT-12, FAT-16) and the size of the partition. A cluster is preferably between 1K and 32 K. In one preferred embodiment, a line is eight bytes, and each cluster is represented by two bytes in a FAT-16 file allocation table. Accordingly, one line of entries written in the file allocation table represents four clusters in the main memory.

In one allocation scheme, entries are written in the file allocation table before data is stored in the clusters represented by those entries. This allocation scheme will be referred to herein as "Simple Allocation Scheme 1" because it is relatively simple to code. This allocation scheme is preferably used to store files of known size ("static allocation"). In operation, before storing a file of a known size, the file allocation table is read to determine the next available clusters in main memory. The clusters that will be used to store the file are allocated by committing the appropriate open clusters to the new file. The file data is then written into the allocated clusters. Writing entries into the file allocation table before writing data ensures that the file allocation table does not incorrectly report free space. Consider, for example, the situation in which a write operation was not allowed to complete (e.g., because a user removed the memory device or there is a power loss while writing data to clusters in main memory). If the clusters were not allocated in the file allocation table before the write attempt, the file allocation table would show those clusters as being free even though data might have been written into them during the interrupted write operation. This would cause a write error the next time those unallocated clusters were written into. However, if the clusters were allocated in the file allocation table before the write attempt, those clusters would not appear to be free.

FIGS. 1A and 1B will now be used to illustrate how errors are handled in Simple Allocation Scheme 1. In this example, a file is to be stored in the first line of clusters of main memory. (As described above, a line of clusters is represented by one line of FAT entries and, in the embodiment, comprises four clusters.) The write operation starts by writing entries into the file allocation table for the four clusters to be written. As shown in FIG. 1A, FAT entry 1 points to cluster 2, FAT entry 2 points to cluster 3, FAT entry 3 points to cluster 4, and FAT entry 4 contains an end of file indicator. Next, data is written into the first four clusters of main memory. The data to be placed in cluster 1 is labeled $D_{1/4}$, the data to be placed in cluster 2 is labeled $D_{2/4}$, etc. In this example, $D_{1/4}$ and $D_{2/4}$ are successfully written into clusters 1 and 2, respectively, but there is an error in writing $D_{3/4}$ in cluster 3. Since cluster 3 is bad, FAT entry 2, which points to cluster 3, is no longer valid. Because FAT entry 2 cannot be re-written, a FAT close operation is performed to generate a new file allocation table, as shown in FIG. 1B. In the new file allocation table, FAT entry 2 points to cluster 4 instead of cluster 3, and FAT entry 3 is marked as bad. Further, unlike the original file allocation table, FAT entry 4 points to cluster 5, and FAT entry 6 contains an end of file indicator. $D_{3/4}$ is then written in cluster 4, and $D_{4/4}$ is written in cluster 5.

Figure 2B:
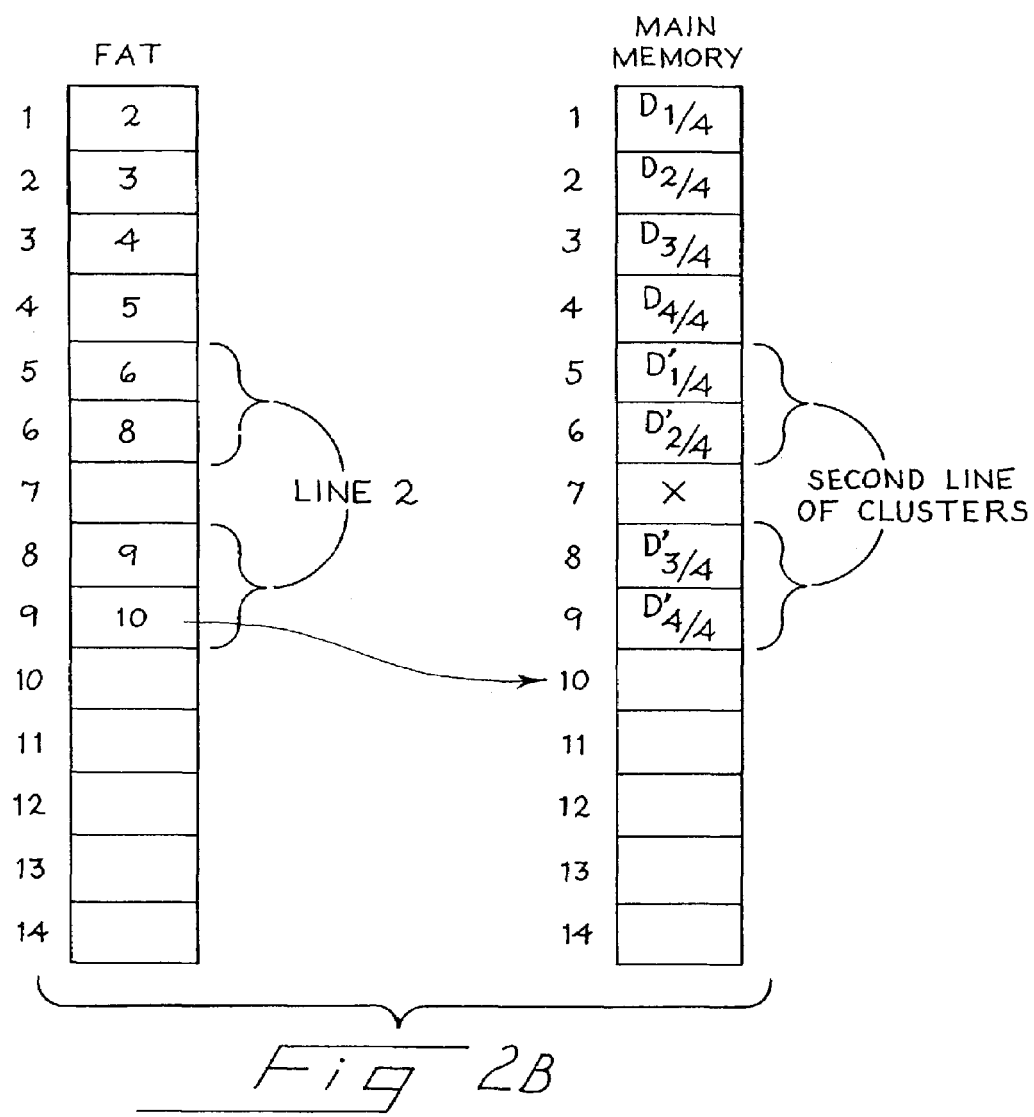

As shown by the preceding example, writing FAT entries for the entire file before writing data to the main memory can result in an inefficient use of memory. Specifically, an entirely new file allocation table is needed if there is an error writing to a single cluster in the main memory. To minimize memory utilization overhead of write errors, another allocation scheme ("Simple Allocation Scheme 2") can be used. In this allocation scheme, instead of allocating all of the clusters in the file allocation table before writing a single cluster in main memory, a line of clusters is written to the main memory before that line is allocated in the file allocation table. FIGS. 2A–2D will be used to illustrate the operation of this allocation scheme. First, one line of clusters is written to the main memory. As used herein, a "line of clusters" refers to the number of clusters represented by one line of FAT entries. As described above, a "line" is the minimum amount of data that can be written to the write-once memory array. In this preferred embodiment, a line is eight bytes, and a single FAT entry is two bytes. Accordingly, a "line of clusters" is four clusters in this preferred embodiment. FIG. 2A shows data written in clusters 1–4. If no errors occur in writing data in the line of clusters, a line of entries (four individual entries) is written in the file allocation table for the line of clusters, as shown in FIG. 2A. This process of writing one line at a time interleaved between FAT entries and data clusters continues until the entire data file is written to the main memory;

Error handling in this allocation scheme depends on which cluster in the line of clusters contains an error. If the error occurs in the first cluster of the very first line of clusters, the line can simply be re-written in available clusters because the starting cluster number has not yet been committed in the file entry. If there is an error in a cluster other than the first cluster in a subsequent line, the error can be dynamically handled because there are no allocated entries in the file allocation table that point to any of the clusters in that line. Consider, for example, the situation in which an error occurs in the third cluster (cluster 7) in a second line of clusters, as shown in FIG. 2B. Because no entry written in the file allocation table points to cluster 7, the data that would have been written in cluster 7 can be written in cluster 8. After the last cluster in that line is written (cluster 9), the file allocation table entries are written so that cluster 7 is skipped, and an end-of-file (or other value) is placed in the entry for cluster 7 to indicate that it is a bad cluster. Because the error occurred in a cluster that was not allocated in the file allocation table, this data allocation scheme provided for dynamic error handling of the error in cluster 7.

Figure 2C:
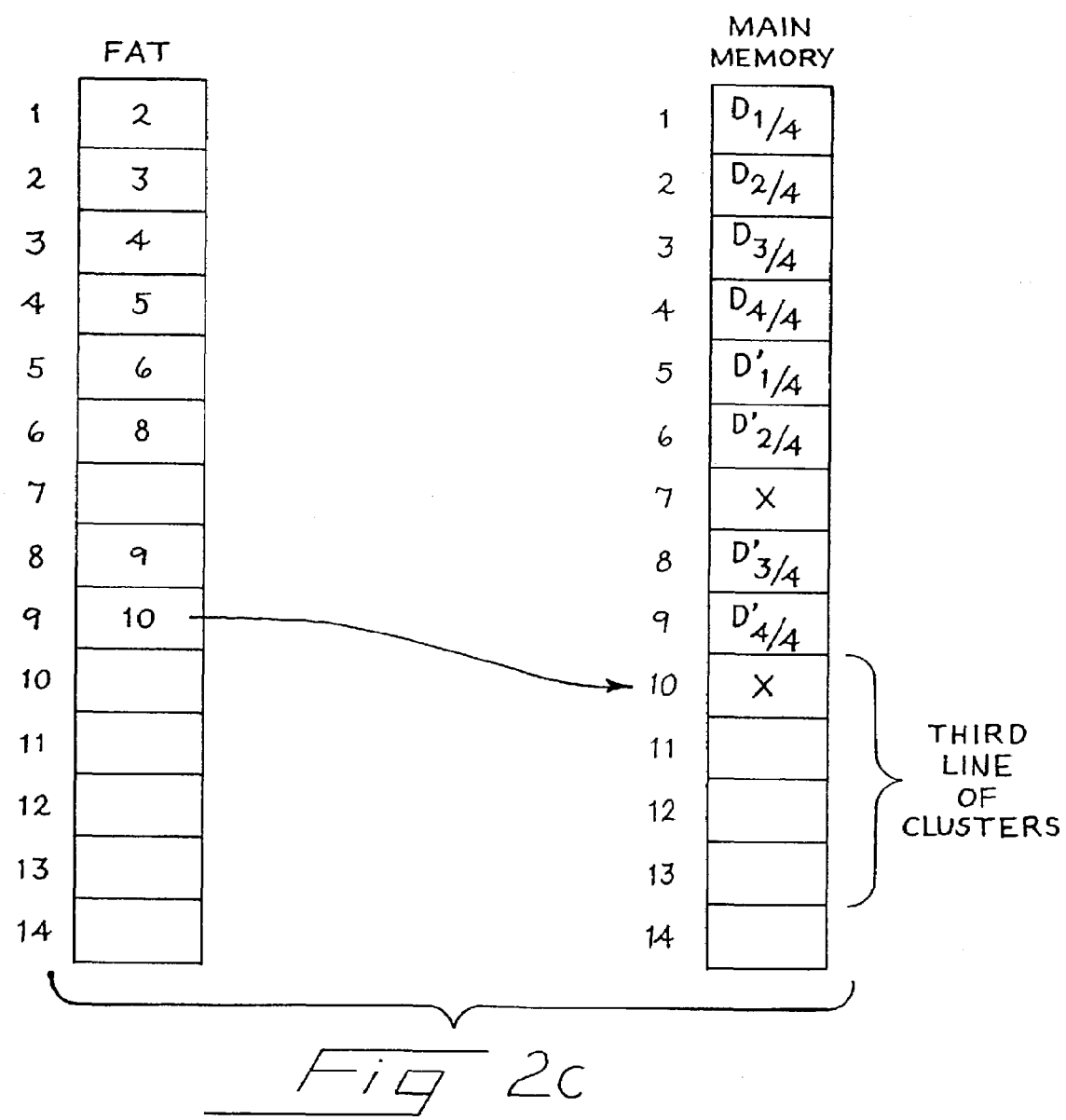

The only uncorrectable error occurs when there is an error in a cluster that is pointed to by an entry written in the file allocation table. For example, in FIG. 2B, FAT entry 9 points to the yet-to-be-written-to cluster 10, which is the first cluster in the third line of clusters to be written to the memory array. If an error occurs in writing data in cluster 10, as illustrated in FIG. 2C, FAT entry 9 would be invalid. Because FAT entry 9 cannot be changed, a FAT Close operation is performed to generate a new file allocation table with FAT entry 9 pointing to cluster 11 instead of cluster 10, as shown in FIG. 2D.

It should be noted that unlike Simple Allocation Scheme 1, Simple Allocation Scheme 2 attempts to write data to clusters before those clusters are allocated in the file allocation table. Since the memory device can be removed or power can be interrupted before the clusters are allocated in the file allocation table, it is preferred that the memory be scanned at startup to ensure all clusters are properly allocated and that unallocated clusters are marked appropriately in the file allocation table. Alternatively, the dynamic error handling technique describe above can be used to handle the error when the memory device attempts to write data in a non-free cluster. However, this alternative would show a bandwidth drop.

As illustrated by the foregoing examples, memory utilization overhead of handling write errors is less using Simple Allocation Scheme 2 as compared to using Simple Allocation Scheme 1. Specifically, Simple Allocation Scheme 1 requires a FAT Close operation to be performed whenever an error occurs in writing data to main memory, whereas Simple Allocation Scheme 2 requires a FAT Close operation to be performed only when an error occurs in writing data to the first cluster of a line of clusters (other than the very first line of clusters). If an error occurs in any of the other clusters of a line of clusters, Simple Allocation Scheme 2 provides for dynamic error handling.

While Simple Allocation Scheme 2 provides an improvement over Simple Allocation Scheme 1, there is still a possibility of needing to perform a FAT Close operation every time a line of clusters (other than the very first line) is written to the memory array. To reduce this possibility, an alternate allocation scheme, referred to herein as the "Complex Allocation Scheme," can be used. With the Complex Allocation Scheme, only an error in the first cluster of every other line of clusters (instead of the first cluster of every line of clusters) will trigger a FAT Close operation. As with Simple Allocation Scheme 2, an error in the very first line of clusters does not trigger a FAT Close operation. The Complex Allocation Scheme is preferably used to write files whose sizes are not known during creation (e.g., files that are created in real-time, such as streaming video) ("dynamic allocation"). In the Complex Allocation Scheme, X lines of clusters and X lines of FAT entries are "allocated" at a time, where $X \geq 2$. The number of lines of clusters (X) can be fixed (e.g., set in the file system and never changed) or variable (e.g., via a compilation option set by the application developer based on file size assumptions). The Complex Allocation Scheme will now be described in reference to the flow chart in FIG. 3 and the diagrams shown in FIGS. 4A–4E.

Figure 3:
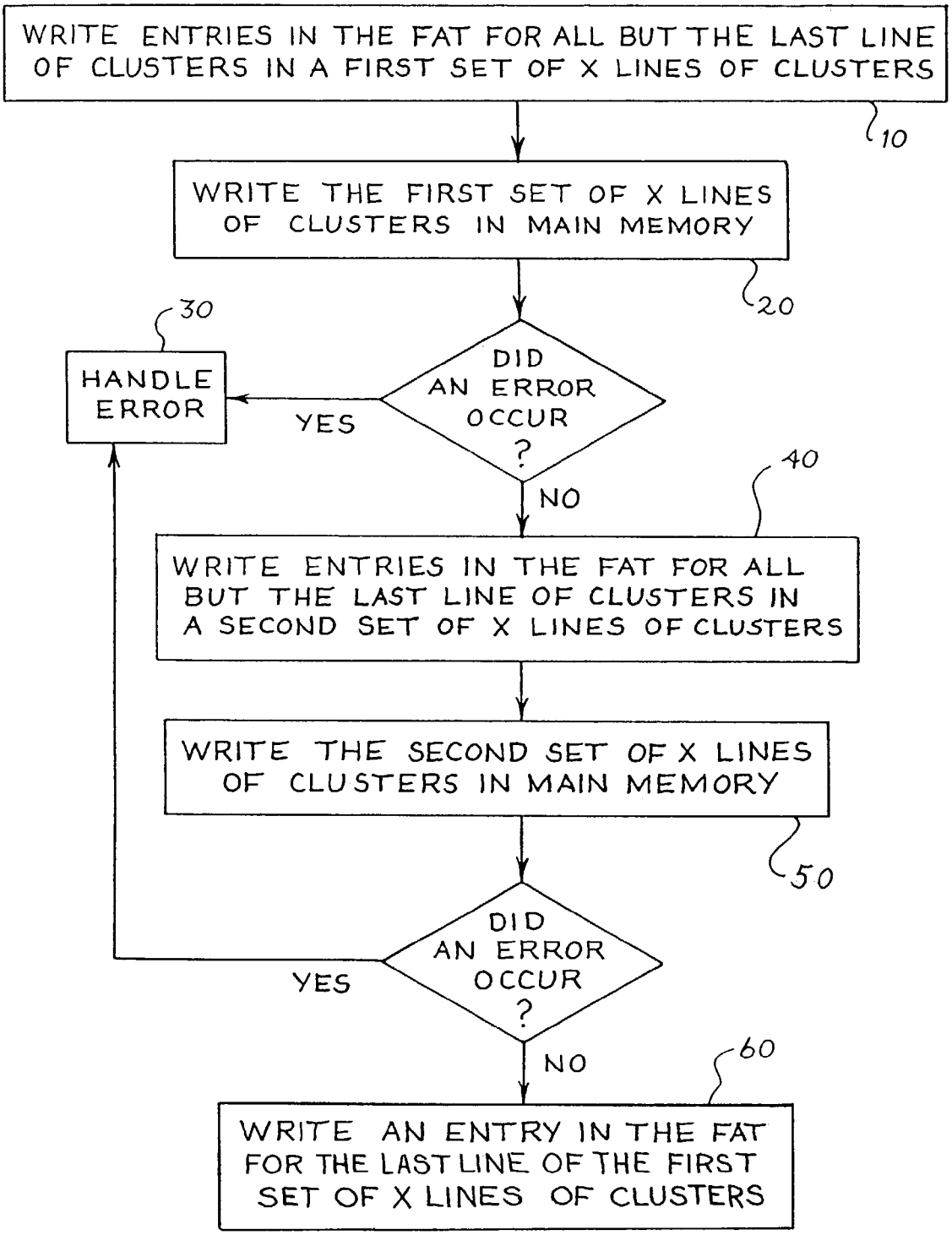
FIG. 3 is a flow chart of a method of a preferred embodiment for writing data to a write-once memory array.

As shown in FIG. 3, the first act in this method is to write entries in the file allocation table for all but the last line of clusters in the first set of X lines of clusters (act 10). In this example, X=2, and the first line of entries is written in the file allocation table, as shown in FIG. 4A. (If X=4, for example, the first three lines of entries would be written in the file allocation table.) As will be described below, the final line of entries is not written in the file allocation table until the first line of clusters in the next allocation unit has been written correctly. In this way, if an error occurs in the next allocation unit, it can be recovered with minimal impact in many situations.

Next, the first set of two lines of clusters is written in the main memory (act 20). This is shown in FIG. 4B, with data (D) filling each of the four clusters in each of the two lines of clusters of the first set. If an error occurs in writing the data in these clusters, the error is handled (act 30), as described below. If no error occurs, entries in the file allocation table are written for all but the last line of clusters in a second set of two lines of clusters (act 40). This is shown in FIG. 4C. Next, the second set of two lines of clusters is written in the main memory (act 50) (see FIG. 4D). If an error occurs, the error is handled (act 30), as described below. If no error occurs in writing the second set of X lines of clusters, an entry is written in the file allocation table for the last line of the first set of two lines of clusters (act 60) (see FIG. 4E). After completely writing one allocation unit's worth of data and filling in the file allocation table appropriately, another unit's worth of data is allocated, and the above acts are repeated.

To reduce the possibility of a write error from occurring, it is preferred that an ECC scheme be used. While ECC can cover many errors, there is still the finite possibility that an error can occur that is not correctable by ECC protection. Accordingly, it is preferred that the file system of the host device contain error recovery mechanisms to handle write errors. There are tradeoffs associated with different methods of error recovery. Typically, recovery can be optimized for data overhead at the expense of complexity, time to market, and firmware code size. The following paragraphs describe various error recovery mechanisms. As with Simple Allocation Scheme 2, error handling depends on the cluster where the error occurred.

FIGS. 5A and 5B illustrate the situation in which an error occurs in the very first line of clusters of a file written to the memory array. FIG. 5A shows an error occurring in the second cluster of the first line of clusters. Entries for the first line of clusters are already written in the file allocation table. However, there is no entry in the file allocation table pointing to any of the clusters in the first line of clusters because the first line of clusters is the start of the file. The first cluster in the first line of clusters is pointed to by a starting cluster in the directory entry for the file. It is preferred that the starting cluster not be written in the directory entry until after the first two lines of clusters have been successfully been written in the main memory. In this way, if an error occurs in the first line of clusters, that line can be written in available clusters in the memory array, and the starting cluster in the directory entry can be set to the first cluster. For example, in FIG. 5B, the first line of clusters planned for clusters 1–4 were copied into clusters 5–8. The new entries to the file allocation table are tracked in DRAM. When the next allocation is complete, the new entries are written to the file allocation table, and the starting cluster number is set to cluster 5 in the directory entry. If cluster 1 was already written in the starting cluster field of the directory entry, the FAT Clean operation described below can be used to write a new directory entry to replace the old one.

Figure 6:
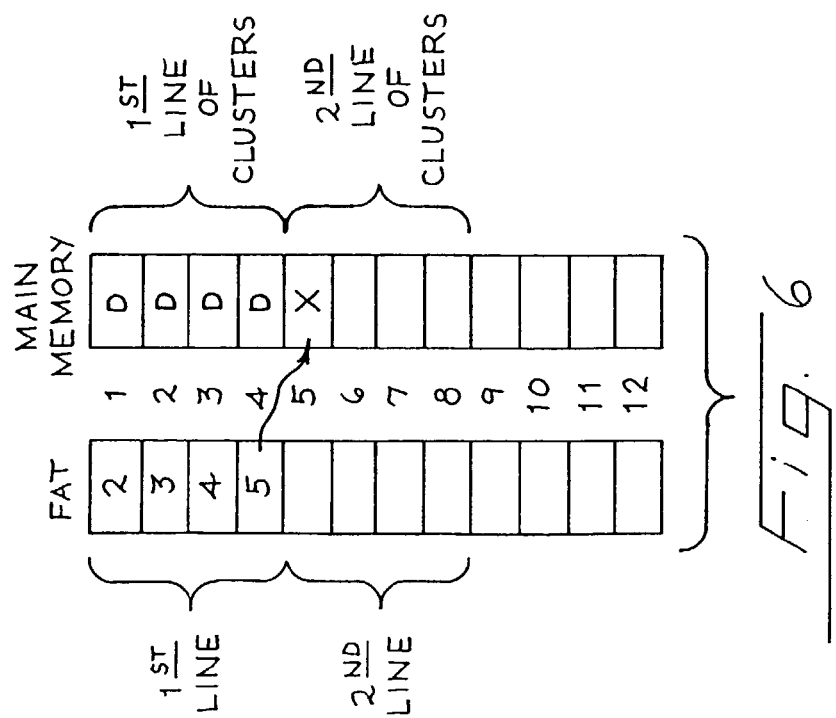
FIG. 6 illustrates an error handling operation of the method shown in the flow chart of FIG. 3 when an error occurs in the first cluster of the second line of clusters.

FIG. 6 illustrates the situation in which an error occurs in the first cluster of the second line of clusters. As shown in FIG. 6, the last entry written in the file allocation table points to cluster 5. If an error occurs in writing data to cluster 5, FAT entry 4 would be invalid. In this situation, the data that would have been written in cluster 5 is stored in an available cluster, and a FAT Close operation can be performed. The FAT Close operation will generate a new file allocation table that will not point to cluster 5 and will ensure that the new file allocation table is read instead of the old one. Alternatively and preferably, a FAT Close operation is not performed. Instead the two lines of clusters are written elsewhere in main memory, and two new lines of file allocation table entries are written. After the two new lines of file allocation table entries have been successfully written, the first cluster of the newly-written two lines of clusters is written into the starting cluster number field of the directory entry for the file.

Figure 7A:
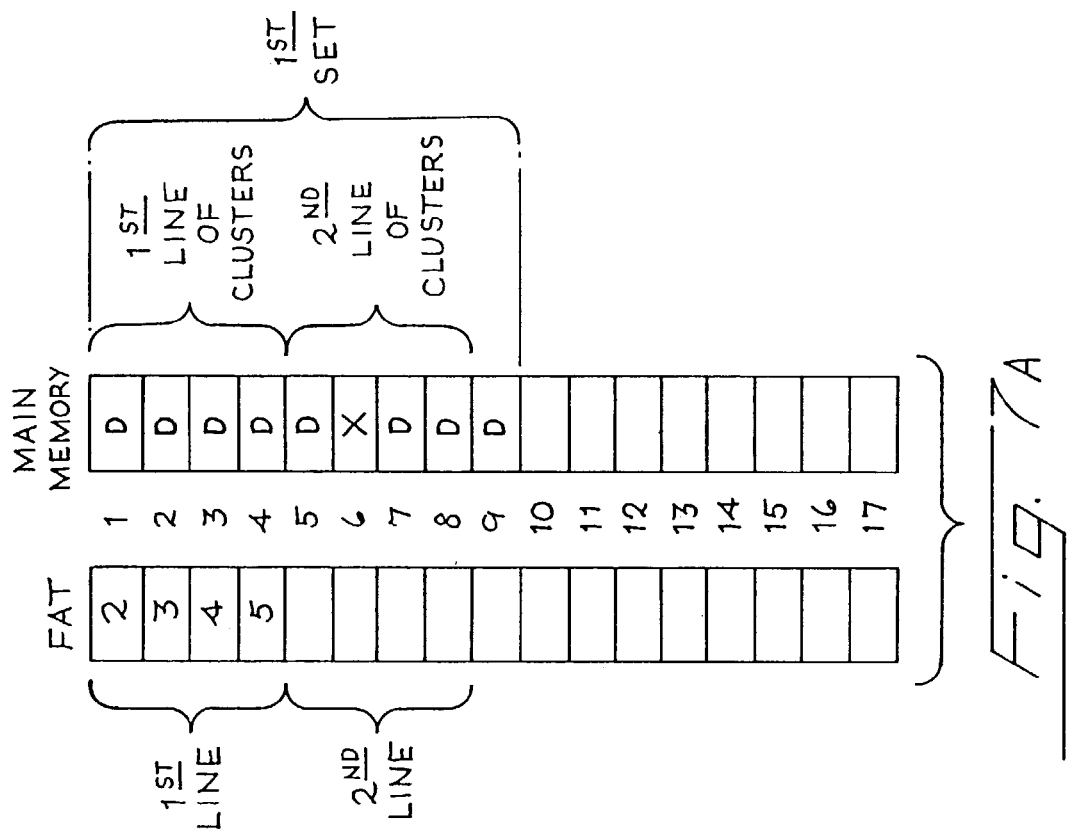

FIGS. 7A–7C illustrate the situation in which an error occurs in a cluster other than the first cluster in the second line of clusters. In FIG. 7A, the error occurs in cluster 6. Because there are no entries in the file allocation table that point to cluster 6, the data that would have been written in cluster 6 can be written in an available cluster (here, cluster 7), and the other clusters in the line of clusters are written accordingly. Then, the next line of entries are written in the file allocation table for the yet-to-be written third line of clusters, which is the first line of clusters in the second set, as shown in FIG. 7B. When the two lines of clusters from the second set are written in the main memory, the entries for the second line of clusters from the first set are written in the file allocation table, as shown in FIG. 7C, and FAT entry 5 points to cluster 7 instead of cluster 6.

Figure 8C:
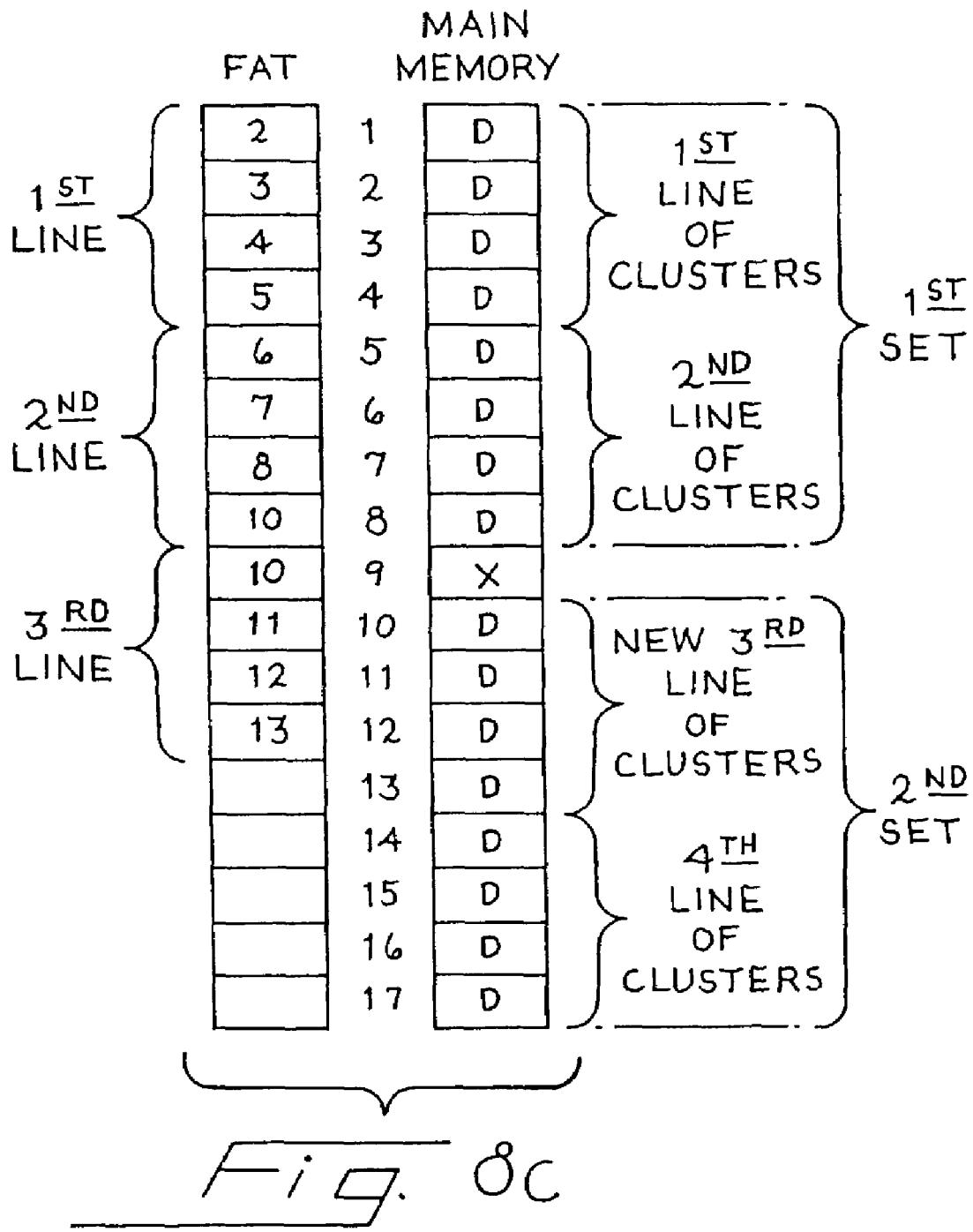

FIGS. 8A–8C illustrate the situation in which an error occurs in the first cluster of the third line of clusters. FIG. 8A shows the error occurring in cluster 9, which is the first cluster of the first line of clusters in the second set. However, since the second line of entries has not yet been written in the file allocation table, there are no entries in the file allocation table pointing to any of the clusters in the third line of clusters. Accordingly, the data for that line of clusters can be stored in any available clusters in the main memory. In FIG. 8B, the data is stored in clusters 10–13. After the fourth lines of clusters has successfully been written to the main memory, the line of entries for the second line of clusters is written to the file allocation table. As shown if FIG. 8C, the last entry of this line (entry 8) points to cluster 10 instead of cluster 9, thereby dynamically correcting the error.

In summary, with the Complex Allocation Scheme, only an error in the first cluster of the first line of a set of two or more clusters (other than the first set of clusters) will trigger a FAT Close operation. This is an improvement over Simple Allocation Scheme 2, where an error in the first line of every cluster (other than the first cluster) triggers a FAT Close operation.

In the embodiments discussed above, a FAT Close operation was triggered by an error in the first line of every cluster (other than the first cluster) in Simple Allocation Scheme 2 and by an error in the first cluster of the first line of a set of two or more clusters (other than the first set of clusters) in the Complex Allocation Scheme. However, those errors are preferably handled without performing a FAT Close operation. Consider, for example, the situation in which an error occurs in writing data to cluster 13 in FIG. 4C. A problem occurs in this situation because FAT entry 12 points to cluster 13. Instead of performing a FAT Close operation, the data written in clusters 9–12 can be copied into clusters 14–17, and the data originally intended for clusters 13–16 can be written into clusters 18–21. When the second line of entries is written into the file allocation table, FAT entry 8 will point to cluster 14 (instead of cluster 9). Accordingly, the error in cluster 13 is handled by "sacrificing" the third line of clusters instead of performing a FAT Close operation. The decision as to which error handling technique to use can be made by comparing the memory overhead associated with a FAT Close operation versus the memory overhead associated with sacrificing a line of clusters. The file system can be programmed to perform one specific error handling technique, or the file system can dynamically make the decision by determining which error handling technique will result is less memory loss.

The paragraphs above described situations in which an error occurred in writing data clusters in the main memory. Other types of write errors can occur. For example, an error can occur in writing an entry to the file allocation table. In this situation, it is preferred that a FAT Close/Clean operation be performed since such as error will result in the page being marked as bad and many entries considered invalid. An error can also occur in writing the root directory. In this situation, it is preferred that the error be fixed by marking the entries invalid in the page the error occurred and then rewriting the entries at the end of the directory listing. It is then preferred that a FAT Clean operation be performed, as discussed below. Accordingly, it is likely that any error in the root directory will automatically result in a FAT Close/Clean operation. The FAT Clean operation will now be described.

As discussed above, a FAT Close operation can be used to re-write DOS FAT file system structures if a change needs to be made to those structures, such as when data is modified. Given the overhead involved in a FAT Close operation, it may be desired to reduce the number of times a FAT Close operation is performed. The data allocation and error recovery schemes discussed above can be used to accomplish this. Another way in which to reduce the number of times a FAT Close operation needs to be performed is by saving changes to the file allocation table in DRAM (or another type of re-writable memory) in the memory device prior to committing the FAT entries to the write-once memory array. This essentially creates a session-based environment that avoids the overhead involved in a FAT Close operation. It may also be desired, in situations where a FAT Close operation needs to be performed, to reduce the overhead involved with that operation. The FAT Clean operation is a variation of the FAT Close operation that requires less overhead by not re-writing invalid entries.

By way of background, because write-once memory cells cannot be re-written, a change to a file system structure is made by invalidating the old file system structure and adding a new file system structure to take its place. In general, to invalidate data in a write-once memory array, the data can be over-written with a destructive pattern. Invalidating previously-stored data in this way is referred to herein as "obliterating" the data and is described in U.S. patent application Ser. No. 09/638,439, which is assigned to the assignee of the present invention and is hereby incorporated by reference. With reference to FIG. 9, in the DOS FAT file system, file information is stored in a 32-byte field containing 11 bytes for the file name (field 110), 1 byte for attributes (field 120), 16 bytes for time and address information (field 130), and 4 bytes for size information (field 140). A directory listing structure contains many 32-byte fields that point to specific files and subdirectories contained in a directory. A subdirectory has the directory attribute set, where files do not. To rename, move, or delete files and directories, the old file structure is invalidated, and a complete, modified new file structure reflecting the change is written at the end of the directory listing structure.

While all of the bits of a file system structure can be obliterated to invalidate the file system structure, it has been determined that obliterating only certain bits of the file system structure can be sufficient to render the file system structure invalid to some host devices. Specifically, it has been determined that setting the attribute bit will cause many host devices to read the file system structure as invalid. In the presently preferred embodiment where a minimum of 8 bytes (a line) can be written to the memory array at one time, it is preferred that the second line of 8 bytes (or second "oct-byte") in a 32 byte file structure be obliterated. With reference to FIG. 10, consider the situation in which a user wishes to rename File 1.jpg as Rename.jpg. Obliterating the second oct-byte 210 in the file structure 200 for File 1.jpg causes the attribute bit to be set to a Logic 0. In this embodiment, it is preferred that bits stored in the write-once memory array be inverted so that a Logic 1 is stored as a Logic 0 and vice versa. In this way, an obliterated data structure will appear as 0xFFh. It is preferred that this bit inversion take place in all locations of the memory array (not just the redirection zone as in some of the embodiments of the above-referenced patent applications) if subdirectories and other file system structures are stored outside of the redirection zone. Accordingly, obliterating the second oct-byte of data sets all the attribute bits to 1, which causes many host devices to skip the outdated entry.

Because some host devices may not read a file system structure with an obliterated second oct-byte as invalid, it is preferred that a new set of file system structures be written excluding the file system structures with the obliterated second oct-byte. This operation is referred to as a FAT Clean operation and can be used to ensure complete compatibility. The FAT Clean operation is similar to the FAT Close operation in that it rewrites the file allocation table, the root directory, and subdirectories listing structures in a new location, and updates the redirection pointer zone so the hardware can see where the most up-to-date data is for redirection. The difference between FAT Close and FAT Clean is that FAT Clean automatically removes entries that have the second oct-byte obliterated. The final output of a FAT Clean operation is therefore a new file allocation table, new root directory, and new subdirectory listings that are completely DOS-FAT compliant. In addition to using the FAT Clean operation when renaming, moving, or deleting files and directories, the FAT Clean operation can be used when there is a change in any information about a file, such as, but not limited to, a change in an attribute field of a file (such as when marking a file as read-only, archive, or hidden), a change in data, a change in file creation time, and a change in file access time.

It is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A method for writing data to a write-once memory array, the method comprising:
   (a) providing a write-once memory array comprising a file allocation table and a main memory, wherein a line is a minimum amount of data that can be written to the write-once memory array, and a line of clusters comprises an amount of clusters in the main memory represented by one line of entries written in the file allocation table;
   (b) for a first set of X lines of clusters, wherein X≧2:
      (b1) writing entries in the file allocation table for all but the last line of clusters in the first set of X lines of clusters; and
      (b2) writing data in the first set of X lines of clusters in the main memory; and
   (c) if no error occurs in writing data in the first set of X lines of clusters:
      (c1) writing entries in the file allocation table for all but the last line of clusters in a second set of X lines of clusters;
      (c2) writing data in the second set of X lines of clusters in the main memory; and
      (c3) if no error occurs in writing data in the second set of X lines of clusters, writing an entry in the file allocation table for the last line of clusters in the first set of X lines of clusters.

2. The invention of claim 1 further comprising:
   (d) if an error occurs in writing data in a first line of clusters in the first set, writing the data in available clusters in the main memory and creating a directory entry pointing to a first cluster in said available clusters.

3. The invention of claim 1 further comprising:
   (d) if an error occurs in writing data in a first cluster of a second line of clusters in the first set, writing the data that would have been written in the first cluster in an available cluster in main memory, generating a new file allocation table, and ensuring that the new file allocation table is read instead of the first-mentioned file allocation table.

4. The invention of claim 1 further comprising:
   (d) if an error occurs in writing data in a cluster, other than the first cluster, of a second line of clusters in the first set, writing the data that would have been written in said cluster in an available cluster and writing an entry in the file allocation table for the available cluster.

5. The invention of claim 1 further comprising:
   (d) if an error occurs in writing data in a cluster of a first line of clusters in the second set, writing the data that would have been written in said cluster in an available cluster and writing an entry in the file allocation table for the available cluster.

6. The invention of claim 1 further comprising:
   (d) if an error occurs in writing an entry in the file allocation table, generating a new file allocation table, and ensuring that the new file allocation table is read instead of the first-mentioned file allocation table.

7. The invention of claim 1, wherein the data being written into the main memory comprises a file of unknown size.

8. The invention of claim 1, wherein X is fixed.

9. The invention of claim 1, wherein X is variable.

10. The invention of claim 1, wherein X=2.

11. The invention of claim 1, wherein the memory array comprises a plurality of memory cells arranged in a plurality of layers stacked vertically above one another in a single integrated circuit.

12. The invention of claim 1 further comprising:
   (d) if an error occurs in writing data in a first cluster of a second line of clusters in the first set, writing data intended to be stored in the first and second lines of clusters in available clusters in main memory and creating a file allocation table entry pointing to a first cluster in said available clusters.

13. The invention of claim 1 further comprising:
   (d) if an error occurs in writing data in a first cluster of a second line of clusters in the first set, determining which of the following acts requires less memory overhead and performing that act:
      (d1) writing the data that would have been written in the first cluster in an available cluster in main memory, generating a new file allocation table, and ensuring that the new file allocation table is read instead of the first-mentioned file allocation table; and
      (d2) writing data intended to be stored in the first and second lines of clusters in available clusters in main memory and creating a file allocation table entry pointing to a first cluster in said available clusters.

14. A method for writing data to a write-once memory array, the method comprising:
   (a) providing a write-once memory array comprising a file allocation table and a main memory, wherein a line is a minimum amount of data that can be written to the write-once memory array, and a line of clusters comprises an amount of clusters in the main memory represented by one line of entries written in the file allocation table;
   (b) writing data in a line of clusters in the main memory; and
   (c) if no error occurs in writing data in the line of clusters, writing a line of entries in the file allocation table for the line of clusters.

15. The invention of claim 14 further comprising:
   (d) if an error occurs in writing data in a first cluster in the line of clusters and the line of clusters is the first line of clusters in a file, writing the data in an available line of clusters in the main memory and creating a directory entry pointing to a first cluster in said available line of clusters.

16. The invention of claim 14 further comprising:
   (d) if an error occurs in writing data in a first cluster in the line of clusters and the line of clusters is not the first line of clusters in a file, writing the data that would have been written in the first cluster in an available cluster in main memory, generating a new file allocation table, and ensuring that the new file allocation table is read instead of the first-mentioned file allocation table.

17. The invention of claim 14 further comprising:
   (d) if an error occurs in writing data in a cluster other than the first cluster in the line of clusters, writing the data that would have been written in said cluster in an available cluster and writing an entry in the file allocation table for the available cluster.

18. The invention of claim 14 further comprising:
   (d) if an error occurs in writing an entry in the file allocation table, generating a new file allocation table, and ensuring that the new file allocation table is read instead of the first-mentioned file allocation table.

19. The invention of claim 14, wherein the data being written into the main memory comprises a file of known size.

20. The invention of claim 14, wherein the memory array comprises a plurality of memory cells arranged in a plurality of layers stacked vertically above one another in a single integrated circuit.

21. The invention of claim 14 further comprising:
(d) if an error occurs in writing data in a first cluster in the line of clusters and the line of clusters is not the first line of clusters in a file, writing data intended to be stored in the line of clusters and in a previously-written line of clusters in available clusters in main memory and creating a file allocation table entry pointing to a first cluster in said available clusters.

22. The invention of claim 14 further comprising:
(d) if an error occurs in writing data in a first cluster in the line of clusters and the line of clusters is not the first line of clusters in a file, determining which of the following acts requires less memory overhead and performing that act:
 (d1) writing the data that would have been written in the first cluster in an available cluster in main memory, generating a new file allocation table, and ensuring that the new file allocation table is read instead of the first-mentioned file allocation table; and
 (d2) writing data intended to be stored in the line of clusters and in a previously-written line of clusters in available clusters in main memory and creating a file allocation table entry pointing to a first cluster in said available clusters.

23. A method for writing data to a write-once memory array, the method comprising:
(a) providing a write-once memory array comprising a file allocation table and a main memory, wherein a line is a minimum amount of data that can be written to the write-once memory array, and a line of clusters comprises an amount of clusters in the main memory represented by one line of entries written in the file allocation table;
(b) writing a line of entries in the file allocation table; and
(c) writing data in a line of clusters represented by the line of entries.

24. The invention of claim 23 further comprising:
(d) if an error occurs in writing data in the line of clusters, writing a second line of entries in the file allocation table and writing data in a second line of clusters represented by the second line of entries.

25. The invention of claim 23 further comprising:
(d) if an error occurs in writing an entry in the file allocation table, generating a new file allocation table, and ensuring that the new file allocation table is read instead of the first-mentioned file allocation table.

26. The invention of claim 23, wherein the data being written into the main memory comprises a file of known size.

27. The invention of claim 23, wherein the memory array comprises a plurality of memory cells arranged in a plurality of layers stacked vertically above one another in a single integrated circuit.

28. A method for generating a set of valid file system structures, the method comprising:
(a) providing a write-once memory array storing a set of file system structures;
(b) invalidating at least some of the set of file system structures; and
(c) re-writing the set of file system structures in a different part of the write-once memory array;
wherein the at least some of the set of file system structures invalidated in (b) are not re-written in (c).

29. The invention of claim 28, wherein each file system structure comprises a respective attribute field, and wherein (b) comprises storing an invalid bit in the respective attribute fields of the at least some of the set of file system structures.

30. The invention of claim 28, wherein a line is a minimum amount of data that can be written to the write-once memory array, wherein each file system structure comprises a plurality of lines, and wherein (b) comprises storing a line of invalid bits only in the line of the file system structure that comprises the attribute field.

31. The invention of claim 28, wherein (b)–(c) are performed in response to a rename operation.

32. The invention of claim 28, wherein (b)–(c) are performed in response to a move operation.

33. The invention of claim 28, wherein (b)–(c) are performed in response to a delete operation.

34. The invention of claim 28, wherein the set of file system structures comprises a directory.

35. The invention of claim 28, wherein the set of file system structures comprises a sub-directory.

36. The invention of claim 28, wherein (b)–(c) are performed in response to a change in an attribute field of a file.

37. The invention of claim 28, wherein (b)–(c) are performed in response to a change to any information about a file.

* * * * *